United States Patent Office 3,378,246
Patented Apr. 16, 1968

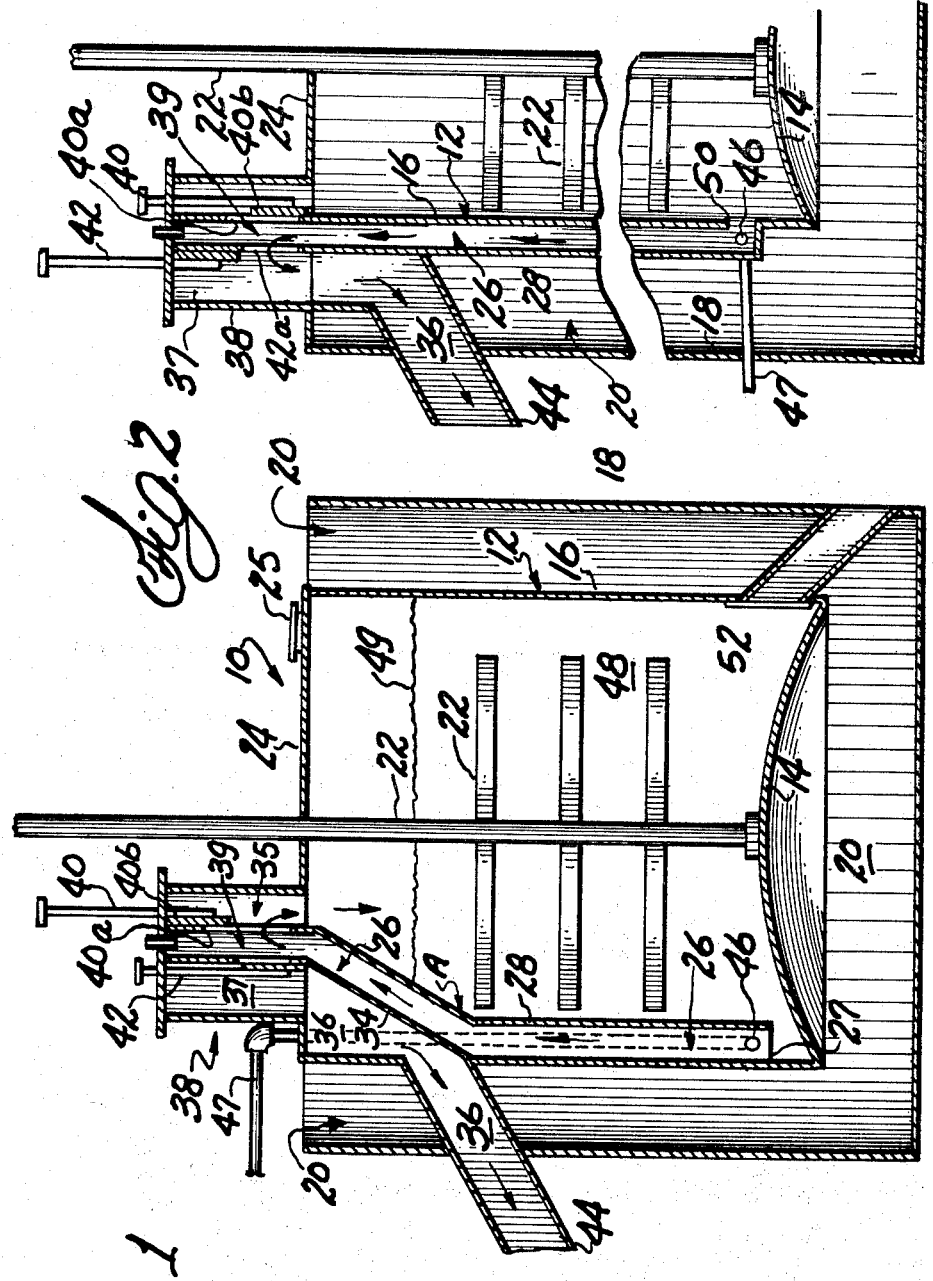

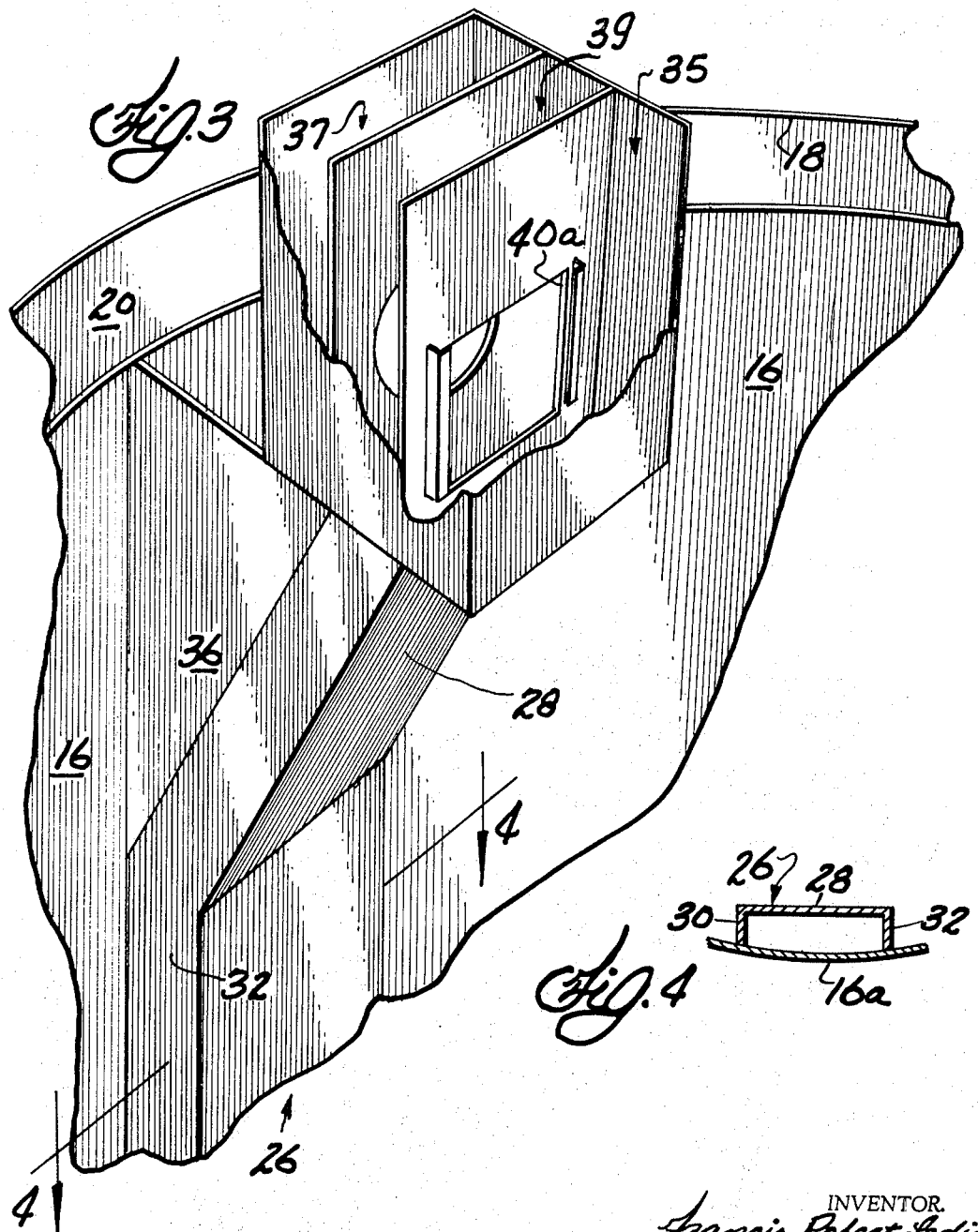

3,378,246
CALCINING KETTLE DISCHARGE APPARATUS
Francis R. Leding, Clarendon Hills, Ill., assignor to United States Gypsum Company, Chicago, Ill., a corporation of Illinois
Filed Nov. 15, 1965, Ser. No. 507,909
7 Claims. (Cl. 263—26)

ABSTRACT OF THE DISCLOSURE

A calcining apparatus comprising a kettle, a heating jacket surrounding the kettle, a rising conduit having a lower end communicating with the interior of the kettle, and a valve operable selectively to bring the upper end of the conduit into discharging communication with the exterior or interior of the kettle, and processes whereby said calcining apparatus may be operated to calcine material in a continuous or batch process.

---

This invention relates to improvements in gypsum calcining kettles and more particularly to apparatus for adapting the conventional gypsum calcining kettle from batch operation to continuous calcination of gypsum and back again. The invention also relates to kettles equipped with apparatus adapted to alternatively permit recycle of gypsum in a batch calcination or continuous calcination of gypsum and to methods utilizing kettles so adapted.

Gypsum calcination can be carried out in a rotary kiln or in kettles operated continuously or batchwise. The apparatus and process of this invention are concerned only with kettle calcination and particularly to kettles modified to permit practicing of either batch or continuous processing. Reference in this application to "continuous" is understood to refer to continuous kettle calcination in this context.

Continuous calcination of gypsum is of importance in the economical production of gypsum stucco, especially stucco adapted for use in gypsum board manufacture. The properties required for gypsum stucco used in board formation, particularly on modern automatic machinery, differ substantially from the properties required of so-called bag plaster usually made in kettles operated by the batch technique. It has been found that stucco produced by the continuous process differs principally from batch process stucco in aging and setting properties.

By experience it has been found that stucco produced by the continuous calcining process is preferred for gypsum board manufacture. It is also well known that a great number of gypsum calcining facilities in the United States are the batch kettle type. Since there are requirements for both continuously calcined and batch stucco, it would be desirable to provide a means for adapting existing kettles to permit rapid and simple conversion from batch to continuous operation and back to batch operations.

Accordingly it is an object of the present invention to provide an improved calcining kettle which is readily adapted for continuous calcining or batch calcining of gypsum.

A further object is the provision of improved gypsum calcining apparatus which may be used for continuous calcination of gypsum but which will not interfere with batch calcining operations.

A still further object is the provision of improvements in calcining kettles which will provide a means of continuous removal of calcined gypsum with minimum risk of plugging.

A still further object is the provision of improved calcining kettle means for continuous removal of calcined gypsum in which the conduit for removal of gypsum has at least one heat exchange surface exposed to the heating medium used to heat the kettle.

A still further object is the provision of improved calcining kettles which operate in a novel recycle technique during batch operation.

A still further object is the provision of novel methods employing the improved operation of this invention.

The fulfillment of these and other objects of the present invention will be more readily understood by reference to the following specification, attached drawings and appended claims.

Accordingly, in one broad form the present invention is an improved kettle for the calcination of gypsum which comprises a vessel of generally cylindrical form having a bottom and a side wall of heat conducting material, walls defining a heating chamber surrounding the bottom and side wall of said vessel, a substantially vertical conduit communicating at its lower end with the interior of said kettle, and having at least part of its surface forming a part of the wall of the chamber, said conduit rising to a height above the calcining contents of the vessel, a valving chamber above said conduit and communicating with it, valve means in said chamber to discharge the contents of the conduit within and without the kettle, selectively and according to a predetermined schedule.

For a more complete understanding of the various embodiments of this invention reference is made to the drawing in which:

FIG. 1 is a sectional view of a gypsum calcining kettle embodying the novel apparatus of the present invention;

FIG. 2 is a partial sectional view of another embodiment of a gypsum calcining apparatus;

FIG. 3 is a partial projected view of the calcining apparatus of FIG. 1 with the valve gates omitted and partially broken away to reveal interior features; and FIG. 4 is a partial cross section of the conduit portion shown in FIG. 3, taken along the line 4—4.

Referring to the drawings, and particularly FIGS. 1 and 3 thereof, there is illustrated in partial section a calcining apparatus 10 comprising a kettle 12 of generally cylindrical form having a bottom wall 14 and side wall 16 of heat conductive material such as iron or steel. The kettle 12 is surrounded by a kettle jacket 18 which is spaced from the walls of the kettle 12 to provide a heat chamber 20. The kettle 12 is equipped with the conventional sweep or agitator 22, cover 24 and associated gypsum inlet port 25. A conduit 26 is provided affixed to the wall 16 of the kettle 12, which outer wall forms one heat exchange surface of the conduit 26 in heat exchange relationship to the heating chamber 20. As shown in FIGS. 1, 3, and 4, the conduit 26 is a U-shaped channel rising from a point indicated here by the reference number 27 near the bottom of the kettle 12 and disposed against the kettle wall 16 to a predetermined point designated as A in the upper portion of the kettle 12 and then rising upwardly and inwardly of the kettle to and through the top 24 thereof. The conduit or channel 26 has an inner wall 28, side walls 30 and 32, and an outer wall 16a which is a sector of the kettle wall 16. The inclined conduit wall 34 defines the upper portion of the conduit and serves as a common wall between conduit 26 and discharge chute 36.

The conduit 26 terminates in a valve chamber 38 including a rising section 39, a discharge section 37, a recycle section 35, a recycle valve 40 and a continuous calcining operation discharge valve 42. The valve chamber 38 is adapted by suitable adjustments of the valves 40 and 42 to direct stucco rising in the conduits 26 and 39 through a recycle chamber 35 or a continuous discharge chamber 37.

The recycle valve chamber 35 used for batch operation recirculates the calcining contents into the kettle 12. The recycle valve port 40a is larger than valve gate 40b and when valve gate 40b is lowered and valve 42 opened, gas and entrained fines pass over the top of gate 40b and through valve port 40a into the kettle 12 via recycle section 35. Continuous discharge section chamber 37 communicates with the chute 36 and conveys calcined stucco through port 44.

An air injection means 46 is provided at the lower portion of the conduit 26 adapted to infuse gas into the contents thereof. The gas, such as air, steam and the like, is furnished to the means 46 by a pipe or similar conducting means 47.

FIG. 2 shows a second embodiment of the apparatus of this invention in which the conduit 26 is disposed within the heat chamber exteriorly of the kettle 12. As shown, the conduit is affixed to the exterior of kettle wall 16, and connects with an inlet 50 in wall 16, thereby communicating with the interior of the kettle 12. Thus three sides of the U-shaped channel 26 are exposed in heat exchange relationship to the heat medium contained within heat chamber 20. In this embodiment conduit 26 rises vertically to the valve chamber 38, and provides an unimpeded path to the kettle 12 to assure a thorough and unobstructed flow of the gypsum being calcined in kettle 12 during this operation.

Other well known internal mechanisms and accessories of the kettle, such as flues, baffles, dust control devices, rotor details, heat supply means, stacks, gypsum feed devices and the like have not been shown for the purpose of simplicity.

As an example of continuous calcining operations carried out using the apparatus of the present invention, a finely divided and pulverized gypsum rock is continuously added to a main body of heated and calcining gypsum in the kettle 12 via inlet 25, and calcined product is continuously withdrawn through conduit 26, riser 39, valve 42, valve port 42a, discharge section 37, chute 36 and port 44, as indicated in FIG. 2. Air is injected into the calcined product in conduit 26 via inlet 46 to thereby reduce the bulk density of the contents causing it to rise in a fluidized state in the path indicated by the arrows. When the fluidized gypsum reaches valve chamber 38 set for continuous operation (i.e. valve 42 open, valve 40 closed) a separation of the air and stucco takes place, the calcined gypsum passing to chamber 37 and the air and entrained calcined gypsum fines passing over valve plate 40b and the upper part of valve port 40a back into kettle 12. This reduces the amount of dust produced by the process and considerably improves the conditions of operation for plant personnel.

A heated medium directed into heat chamber 20 from a source (not shown) communicates heat to heat exchange surface of conduit 26, and imparts the requisite heat and temperature to the conduit contents for the final process step.

Conversion to batch operation from the continuous operation is accomplished by closing valve 42, and raising valve gate 40b (as shown in FIG. 1) by virtue of which adjustments the stucco discharges through the valve port 40a through recycle section 35 and back into the kettle 12. In batch operation a finely divided and fluidized gypsum 48 calcining in the kettle 12 rises, as shown by the arrows, in the conduit 26 and riser 39 into the valve chamber 38, the rising of the calcining material being assisted by air introduced through inlet 46. The conduit contents rise above the level of the material in the kettle, which level is designated by reference numeral 49, and passes through valve 40 in the open position to valve recycle chamber 35, and back to the main body of material in kettle 12. Valve 42 is closed for this operation, so there is no discharge through chute 36. As the gypsum rises in the conduit 26, heat is provided thereto by means of heat exchange or transfer from the kettle wall 16, or more particularly kettle wall sector 16a (reference being had to FIGS. 1, 3 and 4 hereof) made of heat conducting material such as steel or iron, which in turn has been heated by virtue of its position with reference to heat chamber 20. When calcination of the gypsum in kettle 12 is deemed to be complete, the stucco is removed from the kettle by discharge through gate 52.

In the embodiment shown in FIG. 2 the heat transfer to conduit 26 is carried out by virtue of the wall 28 and side walls 30 and 32, which in this drawing are shown disposed exteriorly of the kettle chamber.

One of the advantages of the apparatus of this invention operated under batch conditions is that the continuous discharge of calcined material through the conduit 26 serves to protect the calcining gypsum from over-calcination by virtue of its otherwise prolonged and confined contact within the conduit against the hot wall 16 of the kettle 12.

A further advantage is that this method permits continuous withdrawal of gypsum from the lower portion of the kettle and discharge to the upper portion of the calcining mass during batch calcination, thereby insuring more thorough mixing and consequent calcination.

When it is desired to convert from batch to continuous operation, the valves are adjusted as described previously.

It should be understood that so-called batch process stucco or bag stucco has characteristics which, as indicated in the foregoing, differ from stucco prepared by the continuous calcining procedure, and that the apparatus of the present invention is readily adapted to convert calcining kettles in existing installations from batch to continuous and back to batch operation with a minimum of adjustment and effort. It should also be understood that in the continuous calcining operation of the apparatus of the present invention, the feed of raw uncalcined gypsum and the effluent calcined material leaving the main mass of product in the kettle 12 via conduit 26 and its associated means are coordinated so as to maintain a relatively constant heated body or mass of calcining gypsum within the kettle, although the level at which the gypsum is maintained within the kettle may be readily controlled at the option of the operator.

In batch operation the well known procedure involves the introduction of a charge of finely divided gypsum rock into the kettle, which gypsum rock is then brought to the requisite calcining temperature by the application of heat.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

I claim:

1. An improved calcining apparatus which comprises a calcining kettle of generally cylindrical form having side and bottom walls of heat conductive material, a jacket surrounding said side and bottom walls of the kettle and spaced therefrom to define a heating chamber for containment of a heating medium, a conduit having an inlet portion at the lower end thereof communicating with the interior of the kettle at a point adjacent the bottom thereof and rising upwardly to a point adjacent the top of the kettle and above calcining contents contained within said kettle, and control valve means operatively connected with the conduit positionable for discharging contents of the conduit within and without the kettle, in accordance with a preselected pattern and schedule for continuous or batch calcination.

2. Apparatus according to claim 1, including means for introducing gaseous material at a point adjacent the lower end of the conduit to reduce the apparent bulk density of the contents thereof.

3. Apparatus according to claim 1 wherein the control means include a discharge section, a recycle section, and a riser section intermediate thereof, said riser section communicating with said conduit.

4. An apparatus according to claim 3 wherein intermediate valve means are provided to control transfer of material from the riser section to the recycle and discharge sections.

5. Apparatus according to claim 1 wherein said conduit has at least a substantial portion thereof in heat exchanging relationship to the heating chamber.

6. In a calcining apparatus including a calcining kettle of generally cylindrical form having side and bottom walls of heat conductive material, a jacket surrounding said side and bottom walls of the kettle and spaced therefrom to define a heating chamber for containment of heating gases, the improvement which comprises providing a rising conduit having an inlet portion at the lower end thereof in communication with the interior of the kettle at a point adjacent the bottom thereof and rising upwardly to a point adjacent the top thereof and above calcining contents within said kettle, and having a riser section communicating with the upper end of said conduit, a discharge chamber communicating with said riser section and leading to the exterior of the kettle and a recycle chamber communicating with said riser section leading to the interior of said kettle and a pair of closable valve ports, respectively between the riser section and the recycle chamber positionable to continuously discharge contents of the riser section outside the kettle and positionable to discharge said riser contents to the interior of the kettle in accordance with a pre-selected pattern and schedule.

7. The process of operating a gypsum calcining kettle which comprises the steps of separating a part of the main calcining gypsum mass near the bottom of the kettle, reducing the apparent density of the separated part, establishing a confined rising column of fluidized calcining gypsum adjacent to the kettle wall, maintaining the upward movement of said column beyond the top surface of the main calcining mass, reversing the direction of the fluidized column about 180 degrees and directing predetermined quantities of said fluidized calcining gypsum stream into the main mass.

References Cited

UNITED STATES PATENTS

| | | | |
|---|---|---|---|
| 2,641,063 | 6/1953 | Greiman | 34—102 |
| 2,668,649 | 2/1954 | Clark et al. | 222—193 X |
| 2,307,840 | 3/1967 | Conroy | 263—26 |
| 3,307,915 | 3/1967 | Conroy et al. | 263—53 XR |

FREDERICK L. MATTESON, Jr., *Primary Examiner.*

D. A. TAMBURRO, A. D. HERRMANN,
*Assistant Examiners.*

UNITED STATES PATENT OFFICE
CERTIFICATE OF CORRECTION

Patent No. 3,378,246                         April 16, 1968

Francis R. Leding

It is certified that error appears in the above identified patent and that said Letters Patent are hereby corrected as shown below:

Column 6, line 1, "chamber" should read -- and discharge chambers --; line 22, "2,307,840" should read -- 3,307,840 --.

Signed and sealed this 19th day of August 1969.

(SEAL)
Attest:

Edward M. Fletcher, Jr.                      WILLIAM E. SCHUYLER, JR.
Attesting Officer                              Commissioner of Patents